Feb. 25, 1969 D. F. HENNESSEY ET AL 3,430,147

SQUELCH TAIL PREVENTING CIRCUIT

Filed Jan. 19, 1966

INVENTORS
DARRELL F. HENNESSEY
HOWARD B. ROOKS
BY Max Moody
ATTORNEY

United States Patent Office
3,430,147
Patented Feb. 25, 1969

3,430,147

SQUELCH TAIL PREVENTING CIRCUIT

Darrell F. Hennessey and Howard B. Rooks, Marion, Iowa, assignors to Collins Radio Company, Cedar Rapids, Iowa, a corporation of Iowa Filed Jan. 19, 1966, Ser. No. 521,744
U.S. Cl. 325—402 4 Claims
Int. Cl. H04b *1/10, 1/16*

ABSTRACT OF THE DISCLOSURE

A squelch tail preventing circuit for radio receivers with a loss of signal detecting, fast acting, and integrating circuit connected to an AVC circuit and giving rapid quench of AVC for maximum receiver gain to prevent squelch tail action in a squelch circuit equipped receiver.

This invention relates in general to a method for preventing objectionable hissing in radios.

It is conventional practice to utilize automatic volume control circuits in present-day receivers so as to produce a fairly constant audio output signal with variations in the incoming signal caused by selective fading and other factors. This eliminates the need for continuous adjustment of a manual volume control knob. It is also desirable to turn the loud speaker of a receiver off when no intelligence that is, signaling of a predetermined character, for example, with a syllabic rate content is being received. This eliminates objectionable hissing and static in the speaker when no intelligent signal is being received. It has been observed that with an automatic volume control circuit and squelch circuit when a sudden loss of signal occurs, the squelch circuit is not activated quickly enough to eliminate an undesirable "squelch tail" before the audio circuits are turned off by the squelch circuits.

It is an object of the present invention, therefore, to provide a method for preventing "squelch tails" in radio receivers.

It is another object of this invention to provide an improved radio receiver.

A feature of this invention is found in the provision for an automatic volume control circuit which allows quick recovery in the event of a loss of an incoming signal so that the gain of the receiver may be increased to thus allow the squelch circuit to quickly deactivate the audio transducer.

Figure 1:
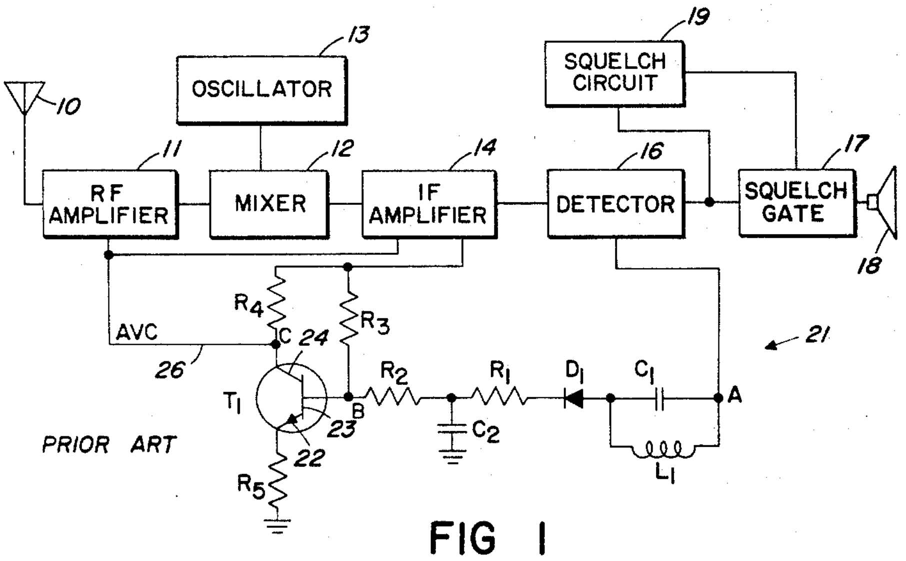
Figure 2:
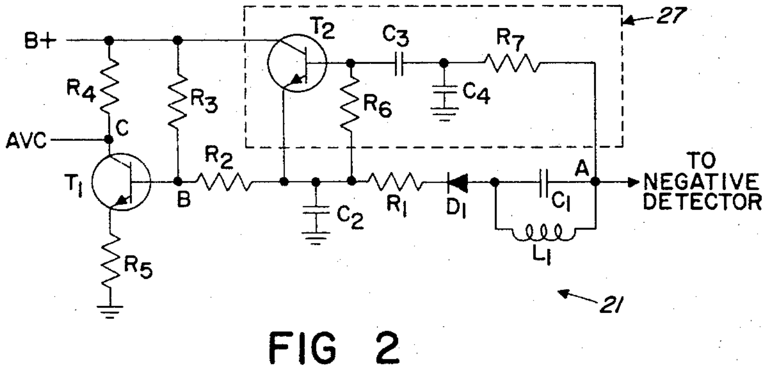

Further features, objects, and advantages of this invention will become apparent from the following description and claims when read in view of the accompanying drawings, in which:

FIGURE 1 is an illustration of a receiver having automatic volume control and squelch as known in the prior art; and FIGURE 2 is a schematic of a radio receiver with the improved automatic volume control and "squelch tail" preventing circuit of my invention.

FIGURE 1 illustrates a conventional radio receiver having a receiving antenna 10 which is connected to a radio frequency amplifier 11 that supplies an output to a mixer 12. A local oscillator 13 supplies an input to mixer 12 and an I-F amplifier 14 receives the output of the mixer. A detector 16 receives the output of the I-F amplifier 14 and supplies an output to a squelch gate 17 which is connected to a suitable signal transducer, as for example, a loud speaker 18. A squelch circuit 19 receives inputs from the detector 16 and I-F amplifier 14 and produces an output which controls the squelch gate 17. It is to be realized that the squelch circuit 19 may be any conventional type and may receive inputs from various portions of the receiver as is common in the art. For convenience, inputs to the squelch circuit are shown from the detector, although the invention is not to be limited to such an arrangement. An output of the detector 16 is supplied to an automatic volume control circuit designated generally as 21.

The automatic volume control circuit 21 comprises a condenser $C_1$ in parallel with an inductor $L_1$ which has one side connected to an input terminal A and the other side connected to a diode $D_1$. The other side of diode $D_1$ is connected to a resistor $R_1$ which has its other side connected to a condenser $C_2$ whose other terminal is grounded.

A resistor $R_2$ is connected to the junction between resistor $R_1$ and condenser $C_2$. The other side of resistor $R_2$ is connected to the base 23 of a transistor $T_1$. The emitter 22 of transistor $T_1$ is connected to ground through a resistor $R_5$. The base 23 of the transistor $T_1$ is connected to a suitable B+ voltage through a resistor $R_3$. The collector 24 of transistor $T_1$ is connected to the B+ bias through resistor $R_4$.

An output lead 26 is connected to the collector 24 and the voltage on lead 26 comprises the automatic volume control voltage of the receiver and is supplied by lead 26 to various portions of the receiver. For example, in FIGURE 1 AVC voltage is supplied to R-F amplifier 11 and I-F amplifier 14.

It has been noted that with an automatic volume control circuit as shown in FIGURE 1 that an undesirable short deviation noise burst occurs after a loss of signal having a detectable characteristic such as, a syllabic rate content. This may be understood by considering that the automatic volume control amplifier $T_1$ is driven through the delay network comprising the resistors $R_1$, $R_2$ and condensers $C_1$ and $C_2$. As either the signal or noise level in the I-F of the receiver increases in magnitude, point A in the automatic volume control 21 becomes more negative with respect to ground. This results in the transistor $T_1$ conducting less current and the automatic volume control voltage at point C rises further above ground. A more positive automatic volume control voltage tends to further reduce the gain in the control stages of the receiver. Upon the sudden loss of signal, the controlled stages are in a reduced gain condition and with reduced receiver gain noise is not amplified sufficiently to activate the squelch circuit until the automatic volume control amplifier has returned to a condition of high gain in the receiver. Thus, the noise comes up and passes through the audio circuits to the speaker before the squelch circuit is activated. This undesirable result is labeled a "squelch tail."

To eliminate this problem, the circuit of FIGURE 2 has been developed. The circuitry of FIGURE 2 is similar to that shown in FIGURE 1 except that a novel portion 27 enclosed by dotted lines has been added to the automatic volume control portion 21 of FIGURE 1.

A second transistor $T_2$ has its collector connected to the B+ voltage and its emitter is connected to the junction point between resistors $R_1$ and $R_2$. A resistor $R_6$ is connected between this junction point and the base of the transistor $T_2$. A condenser $C_3$ is connected to the base of transistor $T_2$ and has its other side connected to a resistor $R_7$. The other side of resistor $R_7$ is connected to point A. A condenser $C_4$ is connected between the junction point between resistor $R_7$ and condenser $C_3$ and has its opposite side connected to ground.

The circuit of FIGURE 2 allows the automatic volume control amplifier and I-F amplifier to return to a high gain condition when an intelligent signal disappears. This allows noise to be amplified rapidly to accomplish quick activation of the squelch circuitry. Upon sudden loss of signal, a positive transient appears at point A in FIGURE 2 which stores energy in capacitors $C_4$ and $C_3$ through the resistor $R_7$. The charge placed on capacitor $C_3$ by this action forward biases transistor $T_2$ so that it conducts and charges capacitor $C_2$ to B+ and moves point B (base of $T_1$) toward the positive supply. Capacitor $C_3$ is large enough to sustain conduction of transistor $T_2$ until the voltage at point C has dropped to a point corresponding to the high gain condition of the receiver. This allows the noise to be amplified to open the squelch gate 17 and disconnect the speaker 18. The values of $R_7$ and $C_4$ are chosen to prevent the activation of the circuit by the detected audio signal. The values of these components combined with the intrinsic junction potential of the base-emitter diode of transistor $T_2$ prevents activation from short duration noise impulses or desired audio on the detector line. Only when sufficient energy is available to overcome the junction potential of about 0.6 volt does conduction occur in $T_2$.

It is seen that the circuit of FIGURE 2 eliminates the objectionable condition known as "squelch tail" by rapidly returning the reeciver to a high gain condition when signal is lost to thus allow rapid activation of the squelch circuit.

Although this invention has been described with respect to particular embodiments thereof, it is not to be so limited, as changes and modifications may be made therein which are within the spirit and scope of the invention as defined by the appended claims.

We claim:

1. A circuit for eliminating delay in operation of a squelch circuit in a radio receiver having a squelch circuit and an automatic volume control circuit, wherein: the automatic volume control circuit includes a bias source, a variable impedance connected to the bias source, and an integrating circuit receiving the output of the receiver connected to the variable impedance to control said variable impedance; and with said circuit for eliminating delay including switch means connected to said integrating circuit and to said automatic volume control circuit to quench said automatic volume control circuit, and with the radio receiver including circuit means capable of detecting when a signal having predetermined characteristics is lost, connected to said switch means for eliminating delays of squelch gate control in the receiver after signal loss.

2. In apparatus according to claim 1 wherein the integrating circuit includes a condenser.

3. In apparatus according to claim 2 wherein said switch means is an electronic device which quickly varies the potential at a point in said volume control circuit to decrease the impedance of the variable impedance.

4. In apparatus according to claim 3 wherein the circuit, capable of detecting when a signal having predetermined characteristics is lost, comprises a resistor and a second condenser connected between the input of the automatic volume control and said switch means for activating said switch means when the signal is lost.

References Cited

UNITED STATES PATENTS

| | | | |
|---|---|---|---|
| 3,092,772 | 6/1963 | Dalton et al. | 325—478 |
| 3,314,010 | 4/1967 | Wolters | 325—478 |
| 3,374,437 | 3/1968 | Heald | 325—348 |

KATHLEEN H. CLAFFY, *Primary Examiner.*

CHARLES JIRAUCH, *Assistant Examiner.*

U.S. Cl. X.R.

325—478